(12) United States Patent
Murakami

(10) Patent No.: US 7,129,667 B2
(45) Date of Patent: Oct. 31, 2006

(54) MOTOR CONTROLLER, LIBRARY APPARATUS, CONVEYANCE ROBOT FOR THE LIBRARY APPARATUS, AND COMPUTER-READABLE STORAGE MEDIUM WITH MOTOR CONTROL PROGRAMS

(75) Inventor: Jun-ichi Murakami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 212 days.

(21) Appl. No.: 10/827,425

(22) Filed: Apr. 20, 2004

(65) Prior Publication Data

US 2005/0140325 A1 Jun. 30, 2005

(30) Foreign Application Priority Data

Dec. 26, 2003 (JP) ............................. 2003-434037

(51) Int. Cl.
 *G05B 11/32* (2006.01)
(52) U.S. Cl. ............... 318/625; 318/723; 318/722; 318/754; 318/138; 318/439
(58) Field of Classification Search ................ 318/625, 318/723, 722, 254, 138, 439, 700, 720, 724, 318/139, 599, 666; 388/804
See application file for complete search history.

(56) References Cited

U.S. PATENT DOCUMENTS 6,225,774 B1 * 5/2001 Masaki et al. .............. 318/723

2003/0200803 A1 * 10/2003 Platt ........................ 73/504.02

FOREIGN PATENT DOCUMENTS

| EP | 0 415 441 A2 | 8/1990 |
| JP | 3-89256 | 4/1991 |
| JP | 6-94342 | 4/1994 |
| JP | 6-165307 | 6/1994 |
| JP | 6-326908 | 11/1994 |
| JP | 8-105270 | 4/1996 |
| JP | 2002-51566 | 2/2002 |

* cited by examiner

*Primary Examiner*—Karen Masih
(74) *Attorney, Agent, or Firm*—Westerman, Hattori, Daniels & Adrian, LLP.

(57) ABSTRACT

A motor controller for simultaneously controlling operations of at least two system motors by pulse-width modulation. The motor controller includes a pair of switches, a pair of pulse signal generators, and a phase shifter. The switches are used for supplying driving power to the two system motors. The pulse signal generators are used for generating a pair of pulse signals respectively having predetermined duty ratios at predetermined cycles, and outputting the pulse signals to the pair of switches to turn on or off the pair of switches. The phase shifter is used for inverting, with respect to the phase of one of the two pulse signals that is generated and output by one of the two pulse signal generators, the phase of the other of the two pulse signals, which is generated and output by the other of the two pulse signal generators, by 180 degrees.

19 Claims, 9 Drawing Sheets

FIG. 4A  S1 (RESTRICTION RATIO 0%)
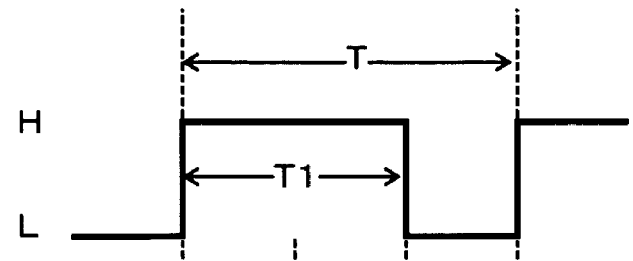
FIG. 4B  S2 (RESTRICTION RATIO 0%)
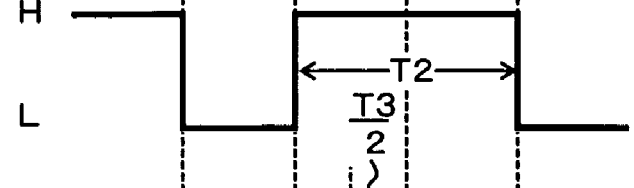
FIG. 4C  S2 (RESTRICTION RATIO 50%)
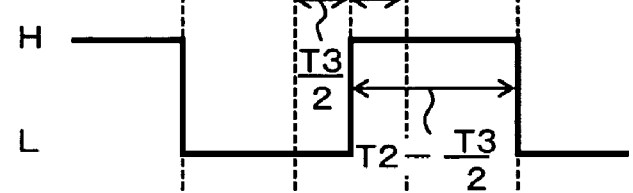
FIG. 4D  S2 (RESTRICTION RATIO 100%)
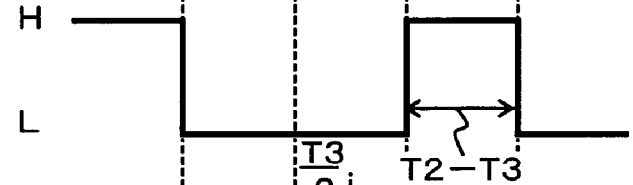
FIG. 4E  S1 (RESTRICTION RATIO 50%)
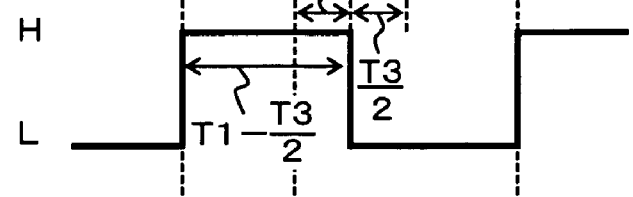
FIG. 4F  S1 (RESTRICTION RATIO 100%)
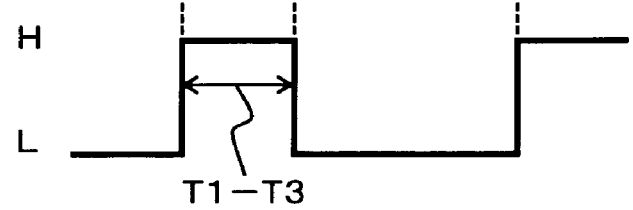

MOTOR CONTROLLER, LIBRARY APPARATUS, CONVEYANCE ROBOT FOR THE LIBRARY APPARATUS, AND COMPUTER-READABLE STORAGE MEDIUM WITH MOTOR CONTROL PROGRAMS

BACKGROUND OF THE INVENTION

1) Field of the Invention

The present invention relates to a technique for digitally controlling operations of at least two system DC motors by pulse-width modulation (PWM). More particularly, the invention relates to a technique suitable for driving and controlling the motors of a conveyance robot (access mechanism) that conveys cartridges within a library apparatus and to a conveyance robot and library apparatus employing the technique.

2) Description of the Related Art

A typical library apparatus serves as a large-capacity external storage and has shelves in which numerous cartridges with magnetic tape as a storage medium are achieved. The storage medium in each cartridge can be automatically accessed to read or write data.

The library apparatus, in addition to the shelves for storing cartridges, is equipped with a plurality of decks for accessing the storage medium (magnetic tape) of each cartridge to read or write data, and a conveyance robot (access mechanism) for conveying cartridges between the shelves and decks.

In the above-described library apparatus, if a request to access a cartridge is accepted from a host, the access mechanism moves to a shelf housing the cartridge, then grasps that cartridge with the hand mechanism of the access mechanism and conveys it to a deck, and inserts the cartridge into the deck. In the deck, data is read from or written to the storage medium (magnetic tape). After the data processing, the cartridge removed from the deck is grasped again by the hand mechanism of the access mechanism, and with this access mechanism, it is conveyed to a housing shelf and housed at a predetermined position.

The access mechanism in a typical library apparatus is shown in FIG. 5 by way of example. The access mechanism 100 shown in the figure is made up of a hand mechanism 110, a horizontal moving mechanism 120, and a vertical moving mechanism 130, in order to convey a cartridge 200 within the library apparatus in the above-described manner.

The hand mechanism 110 consists of a gripping mechanism 111 for grasping a cartridge 200 and inserting and removing the cartridge 200 with respect to a deck or housing shelf, and a swivel mechanism 112 for swiveling the gripping mechanism 111.

The horizontal moving mechanism 120 is used for moving the hand mechanism 110 in a horizontal direction (X-axis direction), while the vertical moving mechanism 130 is used for moving both the hand mechanism 110 and horizontal moving mechanism 120 in a vertical direction (Y-axis direction). The moving mechanisms 120 and 130 are equipped with two system motors 51 and 52 (see FIG. 6), which are driven by pulse-width modulation (PWM).

The above-described access mechanism 100 is constructed so that the requested cartridge 200 grasped by the gripping mechanism 111 of the hand mechanism 110 is conveyed from a certain coordinate point $(X_0, Y_0)$ to a target coordinate point $(X_P, Y_P)$ by the moving mechanisms 120 and 130 (e.g., it is conveyed from a housing shelf to a deck, or from a deck to a housing shelf).

Normally, the moving mechanisms 120 and 130 are operated simultaneously at the highest speed in order to move the cartridge 200 as fast as possible. That is, the two system motors 51 and 52, for operating the moving mechanisms 120 and 130, are digitally controlled by PWM so that they are driven simultaneously at peak power.

Referring to FIG. 6, there is shown a typical circuit that causes two system motors 51 and 52 to operate by PWM. As shown in the figure, the two system DC motors 51 and 52 are connected in parallel with the power supply 71 of a power supply module 70. These DC motors 51 and 52 are also connected in series with switches 61 and 62 so that they are driven by PWM. The power supply module 70, in addition to the power supply 71, is equipped with a smoothing circuit (LPF: Low-Pass Filter) 72.

The PWM signals S1 and S2 from a PWM-signal generation circuit 80 to be described later are supplied to the switches 61 and 62, which are turned on or off according to the states (high or low) of the PWM signals S1 and S2. For example, if the PWM signals S1 and S2 are high (H), the switches 61 and 62 are turned on so that power is supplied to the DC motors 51 and 52. Conversely, if the PWM signals S1 and S2 are low (L), the switches 61 and 62 are turned off so that power to the DC motors 51 and 52 is stopped.

Referring to FIG. 7, there is shown a conventional PWM-signal generation circuit 80 for supplying PWM signals S1 and S2 to switches 61 and 62. As shown in the figure, the PWM-signal generation circuit 80 is made up of a first PWM-signal generator (comparator; CMP) 81, a second PWM-signal generator (comparator; CMP) 82, and a counter 83.

In the PWM-signal generation circuit 80, a cycle set value T0 for determining the cycles T (see FIG. 8) of the PWM signals S1 and S2 is set and it is input to the counter 83. Also, a first duty set value d1 for determining a duty ratio for the PWM signal S1, and a second duty set value d2 for determining a duty ratio for the PWM signal S2, are set at cycles of T. The first and second duty set values d1 and d2 are input to the first and second comparators 81 and 82, respectively. The duty ratio for the PWM signal S1 or S2 is a ratio of the high state to the cycle T. As shown in FIG. 8, the duty ratio of the first PWM signal S1 is t1/T, t1'/T, and t1"/T, and the duty ratio of the second PWM signal S2 is t2/T, t2'/T, and t2"/T.

The counter 83 counts the number of clocks and outputs the count to the comparators 81 and 82 and is reset if it counts to the cycle set value T0. For instance, if the cycle set value T0 is 100, the counter 83 is reset if it counts clocks from 1 to 100. The counts that are output from the counter 83 to the comparators 81 and 82 are 1, 2, 3, . . . , and 100, which are repeated.

The comparators 81 and 82 compare the count from the counter 83 with the duty set values d1 and d2, and switch, according to the result of comparison, the PWM signals S1 and S2 from a high state to a low state, or from a low state to a high state. For example, the comparators 81 and 82 switch the PWM signals S1 and S2 from a high state to a low state when the count from the counter 83 exceeds the duty set values d1 and d2. More specifically, if the duty set values d1 and d2 are 50 (i.e., a duty ratio of 50%), the PWM signals S1 and S2 are in a high state when the count from the counter 83 is between 1 and 50 and are in a low state when the count is between 51 and 100. Also, if the duty set values d1 and d2 are 0 (a duty ratio of 100%), the PWM signals S1 and S2 are always in a high state. If the duty set values d1 and d2 are 100 (a duty ratio of 0%), the PWM signals S1 and S2 are always in a low state.

In this way, in the PWM-signal generation circuit 80, by suitably setting the cycle set value T0 and duty set values d1 and d2, the PWM signals S1 and S2 are generated at desired cycles T so the above-described two system motors 51 and 52 can be driven simultaneously at peak power.

The waveforms and temporal overlap of the PWM signals S1 and S2 generated by the PWM-signal generation circuit 80 shown in FIG. 7 are shown in FIG. 8. As shown in the figure, the PWM signals S1 and S2 generated by the PWM-signal generation circuit 80 shown in FIG. 7 rise simultaneously at predetermined cycles T and hold a high state at the duty ratios determined by the duty set values d1 and d2.

The periods that the PWM signals S1 and S2 rise simultaneously (i.e., the periods that the switches 61 and 62 are simultaneously turned on so that power is simultaneously supplied to the motors 51 and 52) are shown on the bottom row of FIG. 8. During the period the PWM signals S1 and S2 of two systems are simultaneously in a high state, load current of two systems will flow. However, since the temporal overlap of the PWM signals S1 and S2 is very short, it is common practice to suppress an adverse influence due to an instantaneous fluctuation in load by employing a bypass capacitor (not shown) in the power supply module 70. In such a case, the bypass capacitor can employ aluminum electrolytic capacitors that are low-cost and have large capacity.

Note that the technique of adjusting electric current when controlling motors used in a plurality of systems is disclosed, for example, in Japanese Laid-Open Patent Publication Nos. HEI 6-094342, HEI 8-105270, HEI 6-326908, and HEI 3-089256.

However, the above-described motor control methods have the following problems (1) to (3):

(1) Noise Radiation from a Power Supply

By turning on and off the switches 61 and 62, as set forth above, electric energy to be supplied to loads (motors 51 and 52) is temporally controlled, whereby the speed and torque of the motors 51 and 52 are controlled. However, since the switches 61 and 62 are repeatedly turned on and off, a fluctuation in load viewed from the power supply 71 is temporally great and therefore switching noise (electromagnetic compatibility noise) can readily occur.

(2) Life of Aluminum Electrolytic Capacitors for Smoothing a Power Supply

To prevent switching noise such as that mentioned above, the power supply module 70 contains the smoothing circuit 72 consisting of inductive/capacitive elements, as shown in FIG. 6. Note that not only the smoothing circuit 72 within the power supply module 70 but bypass capacitors on a printed board are considered part of the smoothing circuit 72. As shown in FIG. 8, if the high states of the PWM signals S1 and S2 overlap temporally, the two system motors 51 and 52 (loads) become the load on the power supply 71 instantaneously.

To suppress this instantaneous fluctuation in current, high-frequency components are suppressed by forming the smoothing circuit 72 (which consists of a capacitor, etc.) on a power supply path. As a bypass capacitor for a power supply system, it is common practice to employ an aluminum electrolytic capacitor from the standpoint of capacity and cost. The load to suppress instantaneous current fluctuation will be borne by an aluminum electrolytic capacitor itself. Since an aluminum electrolytic capacitor is a capacitor consisting of two aluminum electrodes separated by an electrolyte, the electrolyte will evaporate gradually if it is used at high temperature for a long period of time. The life depends on the operating environment, but is typically 5 to 10 years. Part of instantaneous current fluctuation energy is converted to heat by the equivalent series resistance (ESR) component of a capacitor. FIG. 9 shows a circuit equivalent to a capacitor. The converted heat accelerates the evaporation of the electrolyte of an aluminum electrolytic capacitor and raises the failure rate of a printed board. In FIG. 9, "ESL" represents an equivalent series inductance and "CAPACITOR" represents a capacitor main body.

(3) Increase in the Required Maximum Current-Carrying Capacity of the Power Supply Due to Simultaneous Operations of Two System Motors The motors 51 and 52 consume much current during acceleration or deceleration, while during constant-speed operation, they consume only a small amount of current to compensate for friction losses. In order for the two system motors 51 and 52 to perform acceleration or deceleration, the power supply 71 must have enough current-carrying capacity to stand simultaneous acceleration or deceleration. Such an increase in the current-carrying capacity of the power supply 71 adds to costs.

In addition to the above-described problems (1) to (3), there are the following demands:

One important factor that determines the performance of a library apparatus is the speed at which the cartridge (storage medium) 200 is conveyed. To enhance the conveyance speed, it is necessary to simultaneously operate a plurality of motors (motors 51 and 52 in this example) that are equal to or greater than the number of dimensions in the conveying direction. Of course, if the motors 51 and 52 operate simultaneously at the maximum power that the specification of a library apparatus can allow, they can convey the cartridge 200 fastest.

However, when the moving mechanisms in the X-axis and Y-axis directions (horizontal moving mechanism 120 and vertical moving mechanism 130) operate at peak power to convey the cartridge 200 to a target coordinate point (Xp, Yp), that is, as described above, when the two system motors 51 and 52 are digitally controlled by PWM so that they operate simultaneously at peak power, there is little possibility that because there is a difference between the loads of the two moving mechanisms, the cartridge 200 will reach the target X-axis position Xp and target Y-axis position Yp at the same time. That is, there is little possibility that the operations of the two system motors 51 and 52 will finish at the same time.

Therefore, one of the two motors will finish operation earlier and wait for the other motor to finish operation. Since this state is not efficient, it is desirable to increase the consumption efficiency of the power supply and reduce loads, without sacrificing conveyance time (performance), by controlling operations of two system motors so that they end at the same time. Such a technique is not disclosed in any of the aforementioned four patent documents.

SUMMARY OF THE INVENTION

The present invention has been made in view of the above-described circumstances. Accordingly, when simultaneously controlling operations of at least two system motors by pulse-width modulation, it is an object of the present invention to scatter the peaks of power consumption, achieve a reduction in the load on a power supply and a reduction in the failure rate of a bypass capacitor (accordingly, a reduction in the failure rate of a printed board), and suppress electromagnetic compatibility noise. Another object of the present invention is to increase the consumption efficiency of a power supply and reduce load, without sacrificing conveyance time, by causing operations of two system motors to end simultaneously.

To achieve the aforementioned objects of the present invention, there is provided a motor controller for simultaneously controlling operations of at least two system motors by pulse-width modulation. The motor controller includes a pair of switches, a pair of pulse signal generators, and inversion means. The pair of switches are used to supply driving power to a pair of system motors among the at least two system motors, respectively. The pulse signal generators are used to generate a pair of pulse signals respectively having predetermined duty ratios at predetermined cycles, and output the pulse signals to the pair of switches to turn on or off the pair of switches. The inversion means is used to invert, with respect to the phase of one of the two pulse signals that is generated and output by one of the two pulse signal generators, the phase of the other of the two pulse signals, which is generated and output by the other of the two pulse signal generators, by 180 degrees.

In the motor controller of the present invention, the one pulse signal is caused to rise at the leading edge of the predetermined cycle, and by inverting the phase of the other pulse signal by 180 degrees by the inversion means, the other pulse signal is caused to fall at the leading edge.

The motor controller further includes a counter for counting a clock signal, outputting the count to the pair of pulse signal generators, and resetting the count at the predetermined cycles. The aforementioned pulse signal generators may compare the count from the counter with duty set values that are set at the predetermined cycles to determine the predetermined duty ratios, and generate and output the two pulse signals according to the result of comparison, respectively. The aforementioned inversion means may be constructed as a phase shifter that inverts a phase of the count that is output from the counter to the other pulse signal generator, with respect to a phase of the count that is output from the counter to the one pulse signal generator.

The motor controller of the present invention may further include restriction means that, when there is overlap of the two pulse signals in which the pair of switches are simultaneously turned on by the one pulse signal and the other pulse signal that is inverted by the inversion means, selects one of the two pulse signals and adjusts a waveform of the selected pulse signal to restrict operation of the switch that is turned on by the selected pulse signal.

The aforementioned restriction means may be made up of priority-order determination means, restriction-ratio set means, and adjustment means. The priority-order determination means determines the priority order of the two system motors, based on the content of a predetermined operation request made on the two system motors and characteristics of a device to be driven by the two system motors. Based on the content of the predetermined operation request and the characteristics of the device, the restriction-ratio setting means sets a restriction ratio of the overlap so that operations of the two system motors, which are performed according to the predetermined operation request, end simultaneously. The adjustment means selects as the selected pulse signal a pulse signal that is output to the motor with lower priority determined by the priority-order determination means, and adjusts the waveform of the selected pulse signal according to the restriction ratio set by the restriction-ratio setting means.

In accordance with the present invention, there is provided a conveyance robot, which includes a hand mechanism, a moving mechanism, and a control unit. The hand mechanism is used for inserting and removing a cartridge with a storage medium while grasping the cartridge in order to convey the cartridge within a library apparatus that has a shelf for storing the cartridge and a deck for accessing the storage medium. The moving mechanism includes two system motors and is used for two-dimensionally moving the cartridge grasped by the hand mechanism. The control unit is used for simultaneously controlling operations of the two system motors by pulse-width modulation. The control unit is made up of the aforementioned switches, pulse signal generators, and inversion means.

In accordance with the present invention, there is provided a library apparatus, which includes a shelf, a deck, and a conveyance robot. The shelf is used for storing a cartridge that houses a storage medium. The deck is used for accessing the storage medium. The conveyance robot is used for conveying the cartridge between the shelf and the deck. The conveyance robot is made up of (1) a hand mechanism for inserting and removing the cartridge while grasping the cartridge, (2) a moving mechanism, which includes two system motors, for two-dimensionally moving the cartridge with the cartridge grasped by the hand mechanism, and (3) a control unit for simultaneously controlling operations of the two system motors by pulse-width modulation. The control unit of the conveyance robot is made up of the aforementioned switches, pulse signal generators, and inversion means.

In accordance with the present invention, there is provided a computer-readable storage medium with a motor control program for causing a computer to realize a motor control function of simultaneously controlling operations of at least two system motors by pulse-width modulation. The motor control program causes the computer to function as (1) a pair of pulse signal generators for generating a pair of pulse signals, which turn on or off a pair of switches for supplying driving power to a pair of system motors among the at least two system motors, respectively, having predetermined duty ratios at predetermined cycles, and outputting the pulse signals to the pair of switches; and (2) inversion means for inverting a phase of the other of the two pulse signals, which is generated and output by the other of the two pulse signal generators, by 180 degrees with respect to a phase of one of the two pulse signals that is generated and output by one of the two pulse signal generators.

According to the above-described present invention, the pulse signal generators generate a pair of pulse signals respectively having predetermined duty ratios at predetermined cycles, and output the pulse signals to the pair of switches to turn on or off the pair of switches. Also, the inversion means inverts the phase of the other of the two pulse signals by 180 degrees with respect to the phase of one of the two pulse signals. Therefore, the one pulse signal is caused to rise at the leading edge of the predetermined cycle, and the other pulse signal is caused to fall at the leading edge of the predetermined cycle. This can minimize the period that a pair of pulse signals rise simultaneously, so the peaks of power consumption can be scattered and the peak of current consumed can be smoothed. In addition, a reduction in the load on a power supply and a reduction in the failure rate of a bypass capacitor (accordingly, a reduction in the failure rate of a printed board) can be achieved and electromagnetic compatibility noise can be suppressed.

According to the above-described present invention, when there is overlap of the two pulse signals in which the pair of switches are simultaneously turned on by the one pulse signal and the other pulse signal that is inverted by the inversion means, the aforementioned restriction means selects one of the two pulse signals and adjusts the waveform of the selected pulse signal to restrict operation of the switch that is turned on by the selected pulse signal. In this way, within the capacity of a power supply, a power resource is distributed between the two motors and operations of the two motors end simultaneously. Therefore, the present invention is capable of increasing the consumption efficiency of a power supply and greatly reducing load, without sacrificing conveyance time.

BRIEF DESCRIPTION OF THE DRAWINGS

The present invention will be described in further detail with reference to the accompanying drawings wherein:

FIGS. 4A through 4F are timing diagrams used for explaining restriction ratios employed in the preferred embodiment;

DESCRIPTION OF THE PREFERRED EMBODIMENT

Referring to FIGS. 1 through 4, there is shown a PWM-signal generation circuit constructed in accordance with a preferred embodiment of the present invention.

Figure 2:
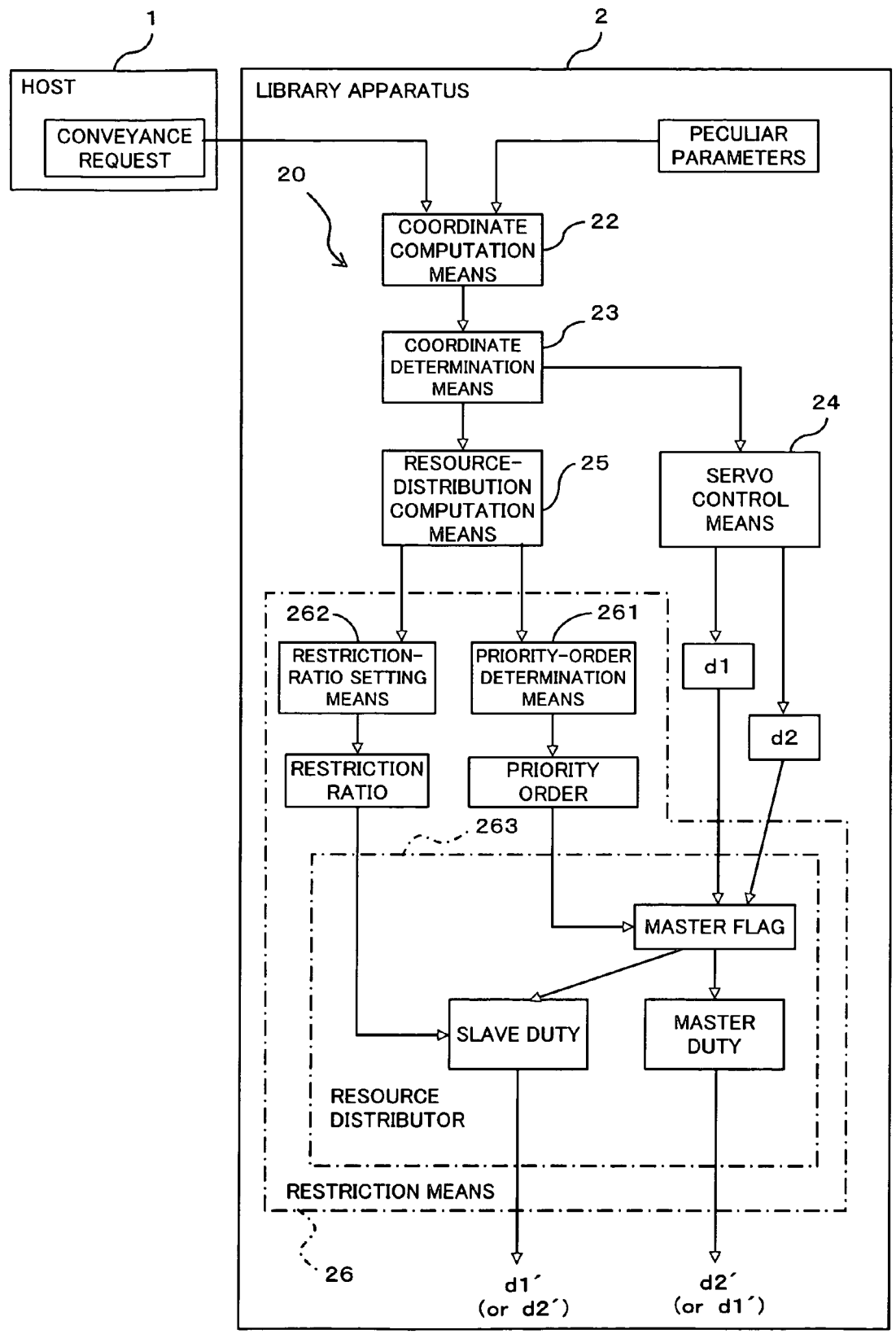
FIG. 2 is a block diagram showing the essential makeup of the PWM-signal generation circuit, and a library apparatus to which the PWM-signal generation circuit is applied.

As shown in FIG. 2, the PWM-signal generation circuit (a motor controller or a control unit) 20 in the preferred embodiment is applied to a library apparatus 2 that operates in response to a request to convey a medium (cartridge), sent from a host 1.

The library apparatus 2, as with the aforementioned library apparatus, is equipped with shelves (not shown) for storing cartridges 200 (see FIG. 5) that house a storage medium (for example, magnetic tape), decks for accessing the storage medium of each cartridge 200 to read or write data, and a conveyance robot 100 (hereinafter referred to as an access mechanism 100 (see FIG. 5)) for conveying the cartridges 200 between the shelves and decks.

Figure 5:
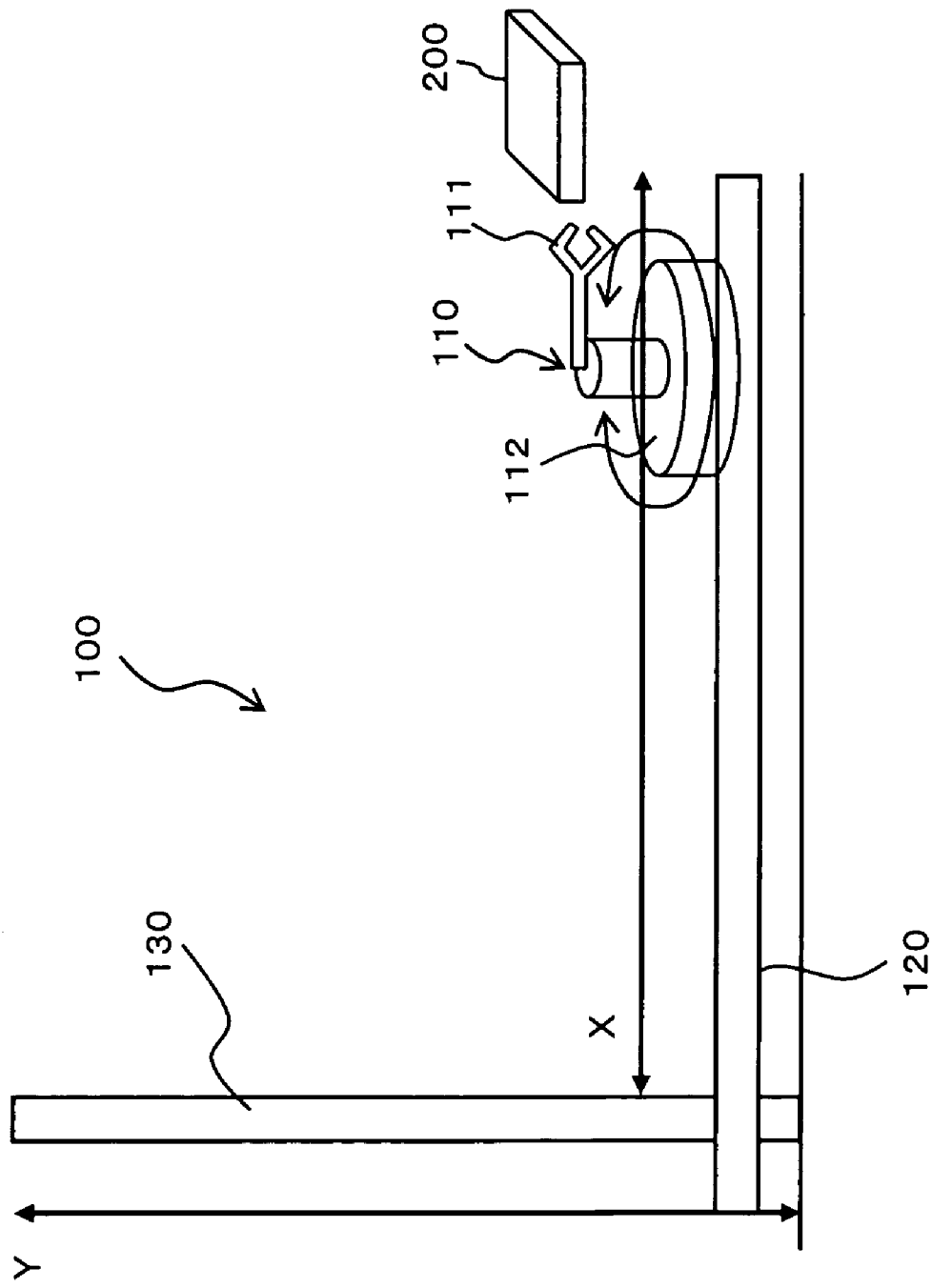
FIG. 5 is a schematic diagram showing the access mechanism of a typical library apparatus.

The access mechanism 100 is made up of a hand mechanism 110, moving mechanisms 120 and 130, and a control part (motor controller), as previously described in FIG. 5. The hand mechanism 110 grasps the cartridge 200 and inserts or removes it with respect to a deck or housing shelf. The moving mechanisms 120 and 130 include two system motors 51 and 52 (see FIG. 6) and two-dimensionally move the cartridge 200 grasped by the hand mechanism 110. The control part simultaneously controls operations of the two system motors 51 and 52 by PWM and is made of the PWM-signal generation circuit 20 and a pair of switches 61 and 62.

In the above-described library apparatus 2, in response to a conveyance request from the host 1, the access mechanism 100 moves to a shelf housing a target cartridge 200, then grasps the cartridge 200 with the hand mechanism 110 of the access mechanism 100 and conveys it to a deck, and inserts the cartridge 200 into the deck. In the deck, data processing is performed on a storage medium (magnetic tape) enclosed within the cartridge 200. After the data processing, the cartridge 200 removed from the deck is grasped again by the hand mechanism 110 of the access mechanism 100, and with this access mechanism 100, the cartridge 200 is conveyed to a housing shelf and housed at a predetermined position.

In the access mechanism 100 of the preferred embodiment, the horizontal moving mechanism 120, for moving the hand mechanism 110 in a horizontal direction (X-axis direction), is equipped with the DC motor 51, and the vertical moving mechanism 130, for moving the hand mechanism 110 in a vertical direction (Y-axis direction), is equipped with the DC motor 52. These two system motors 51 and 52 are driven by PWM.

Figure 6:
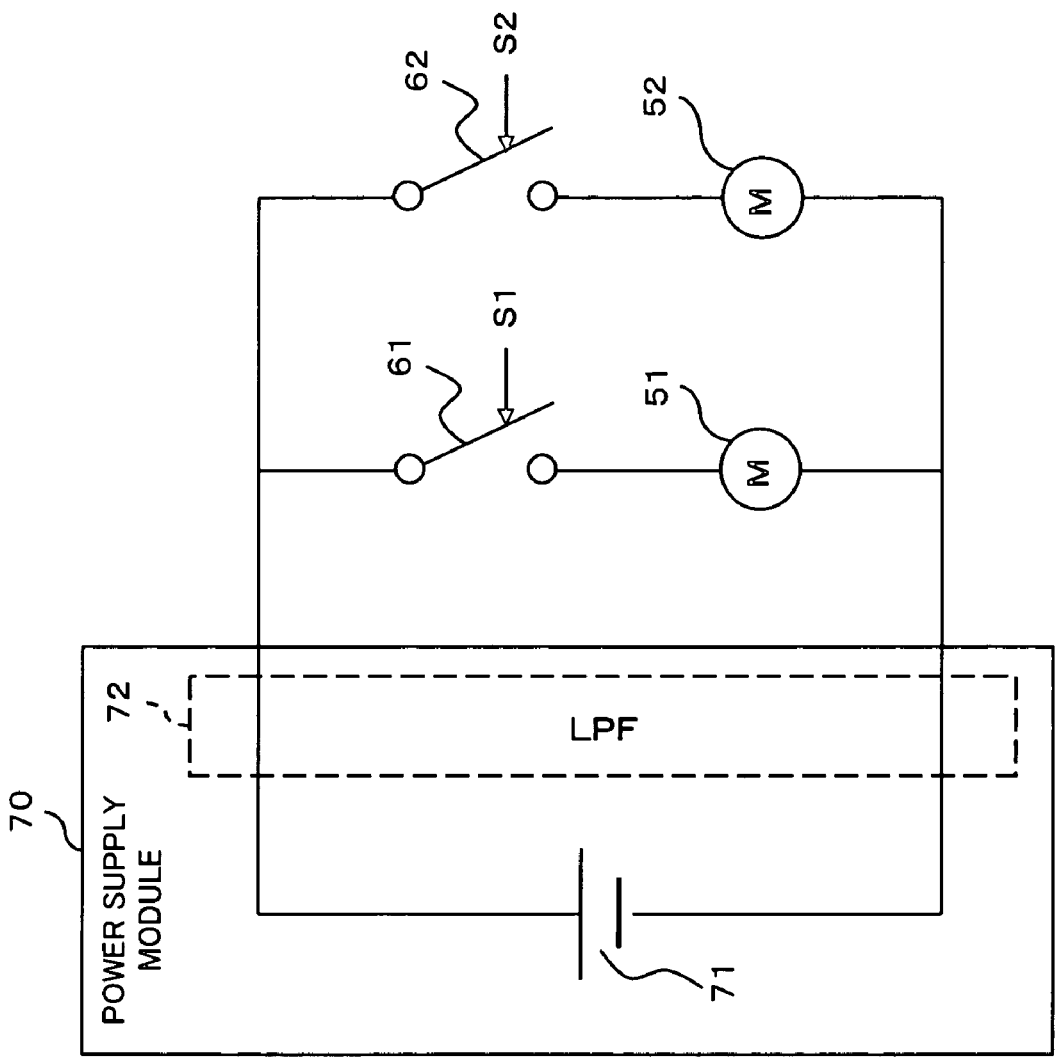
FIG. 6 is a schematic diagram showing a typical circuit that causes two system motors to operate by PWM.

In the access mechanism 100 of the preferred embodiment, the two system DC motors 51 and 52 are similarly connected in parallel with the power supply 71 of the power supply module 70, as previously described in FIG. 6. Also, the DC motors 51 and 52 are connected in series with switches 61 and 62, which are used for driving the motors 51 and 52 by PWM. The PWM signals S1 and S2 from the PWM-signal generation circuit 20 are supplied to the switches 61 and 62, which are turned on or off according to the states (high or low) of the PWM signals S1 and S2. For instance, if the PWM signals S1 and S2 are high (H), the switches 61 and 62 are turned on so that power is supplied to the DC motors 51 and 52. Conversely, if the PWM signals S1 and S2 are low (L), the switches 61 and 62 are turned off so that power to the DC motors 51 and 52 is stopped.

Figure 1:
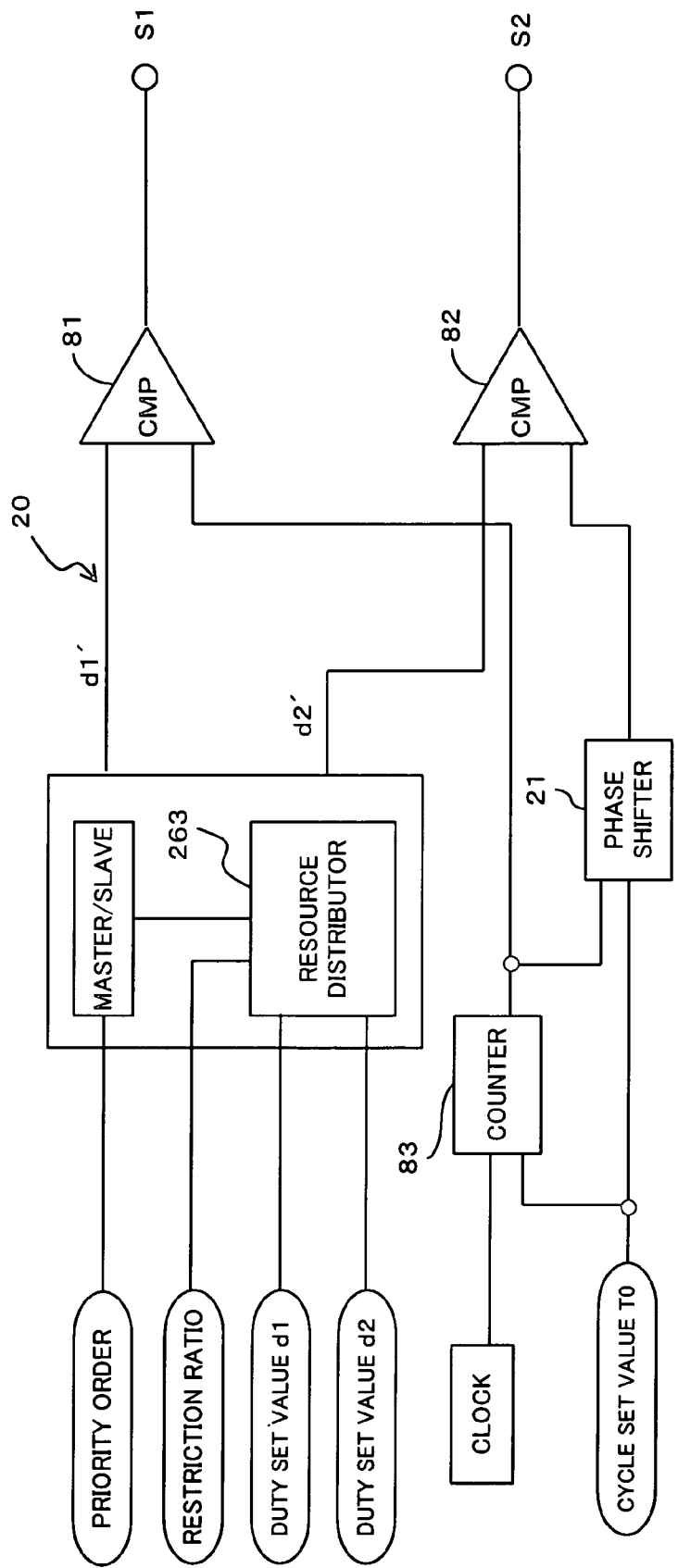
FIG. 1 is a block diagram showing a PWM-signal generation circuit (a motor controller or a control unit) constructed in accordance with a preferred embodiment of the present invention.

Next, the PWM-signal generation circuit 20 of the preferred embodiment, which supplies the PWM signals S1 and S2 to the switches 61 and 62, will be described with reference to FIGS. 1 and 2.

Figure 7:
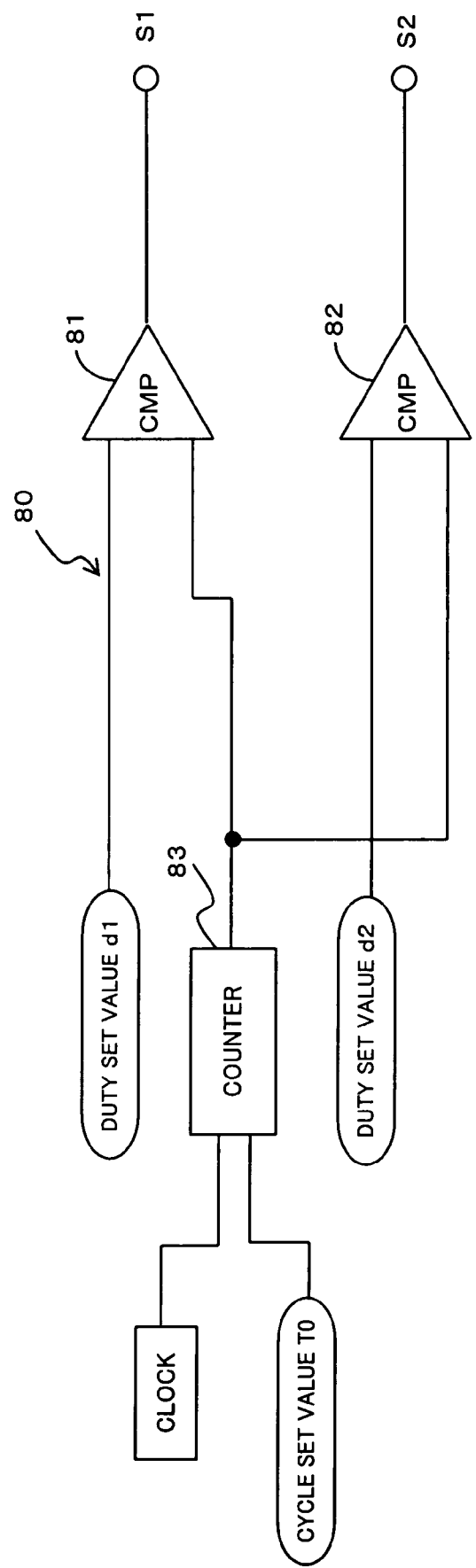
FIG. 7 is a block diagram showing a conventional PWM-signal generation circuit (motor controller)
Figure 8:
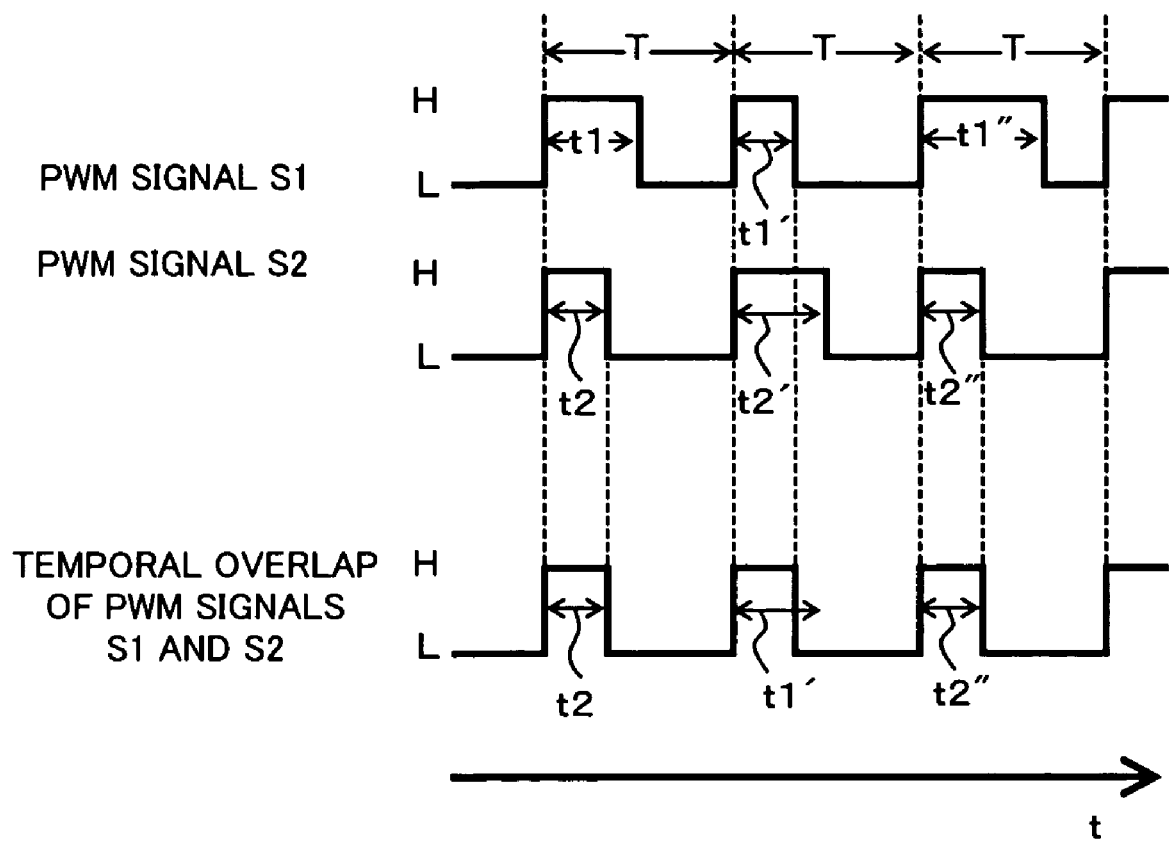
FIG. 8 is a timing diagram showing PWM signal waveforms generated by the PWM-signal generation circuit shown in FIG. 7 and the temporal overlap between the PWM signals.

As shown in the figures, the PWM-signal generation circuit 20 of the preferred embodiment, in addition to the same PWM-signal generators (comparators) 81 and 82 and counter 83 as those described in FIG. 7, is made up of a phase shifter 21, coordinate computation means 22, coordinate determination means 23, servo control means 24, resource-distribution computation means 25, and restriction means 26.

Figure 3:
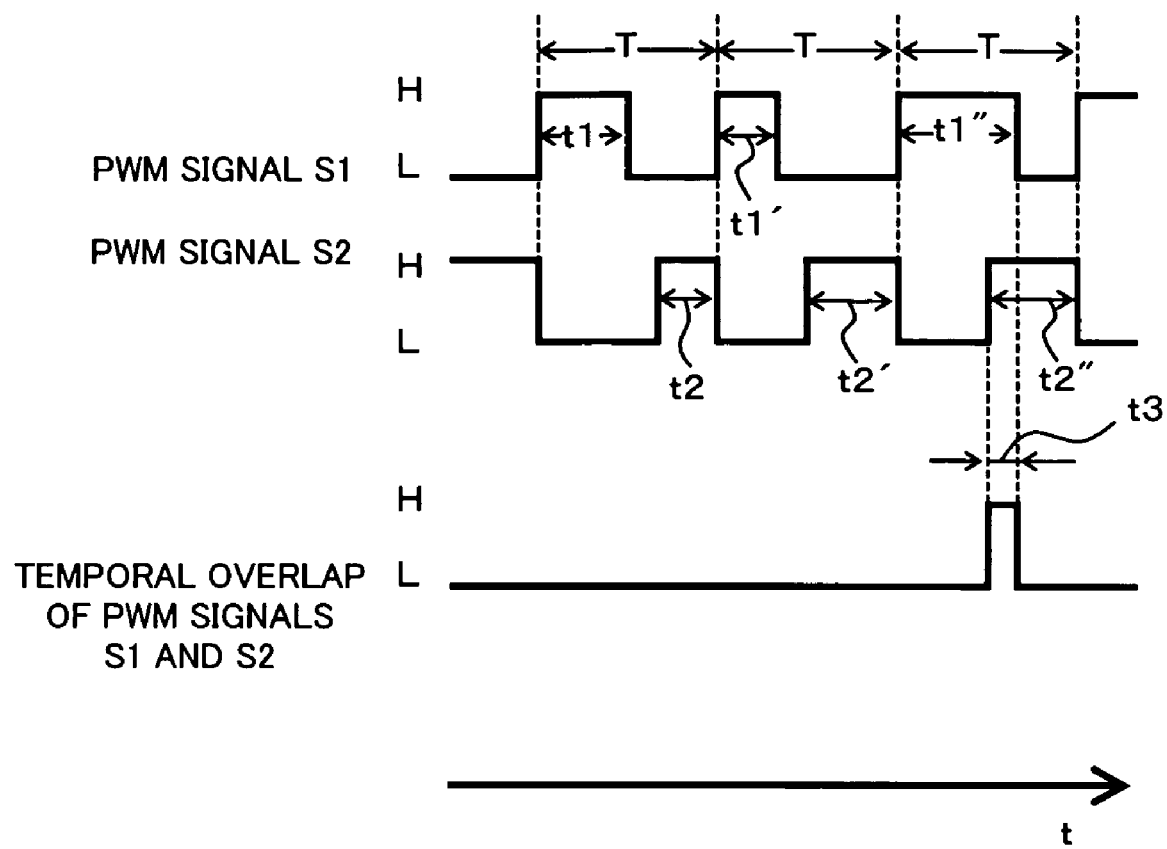
FIG. 3 is a timing diagram showing PWM signal waveforms generated by the circuit shown in FIGS. 1 and 2 and the temporal overlap between the PWM signals.

The PWM-signal generation circuit 20 sets a cycle set value T0 for determining the cycles (see "T" in FIGS. 3 and 4) of the PWM signals S1 and S2. The cycle set value T0 is input to the counter 83 and phase shifter 21. Also, at cycles of T, the servo control means 24 sets a first duty set value d1 for determining the duty ratio of the PWM signal S1, and a second duty set value d2 for determining the duty ratio of the PWM signal S2. The duty set values d1 and d2 set by the serve control means 24 are waveform-adjusted by the restriction means 26 and are input to the first and second comparators 81 and 82 as duty set values d1' and d2'. The duty ratio of the PWM signal S1 or S2 is a ratio of the high state to the cycle T. As shown in FIG. 3, the duty ratio of the PWM signal S1 is t1/T, t1'/T, and t1"/T, and the duty ratio of the PWM signal S2 is t2/T, t2′/T, and t2″/T. As shown in FIG. 4, the duty ratios of the PWM signals S1 and S2 are T1/T and T2/T.

The counter 83 counts the number of clocks and outputs the count to the first comparator 81. The count is also output to the second comparator 82 through the phase shifter 21. The counter 83 is reset if it counts to the cycle set value T0. That is, it is reset at predetermined cycles T. For instance, if the cycle set value T0 is 100, the counter 83 is reset if it counts clocks from 1 to 100. The counts that are output from the counter 83 to the first comparator 81 are 1, 2, 3, . . . , and 100, which are repeated.

The phase shifter (inversion means) 21 is used to invert the phase of the count that is output from the counter 83 to the second comparator 82, with respect to the phase of the count that is output from the counter 83 to the first comparator 81, based on the cycle set value T0. For example, when the count that is output from the counter 83 to the first comparator 81 repeats 1, 2, 3, . . . , and 100, the count that is output to the second comparator 82 through the phase shifter 21 repeats 100, 99, 98, . . . , 3, 2, and 1.

The comparators 81 and 82 compare the count from the counter 83 and the inverted count from the phase shifter with the duty set values d1′ and d2′ and, according to the result of comparison, switch the PWM signals S1 and S2 from a high state to a low state, or from a low state to a high state. For example, the first comparator 81 switches the first PWM signal S1 from a high state to a low state when the count from the counter 83 exceeds the first duty set value d1′. The second comparator 82 switches the second PWM signal S2 from a low state to a high state when the inverted count from the phase shifter 21 exceeds the second duty set value d2′.

More specifically, if the first duty set value d1′ is 50, the first PWM signal S1 is in a high state when the count from the counter 83 is between 1 and 50, and is in a low state when the count is between 51 and 100 (i.e., a duty ratio of 50%). On the other hand, if the second duty set values d2′ is 50, the second PWM signal S2 is in a low state when the inverted count is between 100 and 51, and is in a high state when the inverted count is between 50 and 1 (i.e., a duty ratio of 50%). Also, if the duty set values d1′ and d2′ are 0 (a duty ratio of 0%), the PWM signals S1 and S2 are always in a high state (a duty ratio of 100%). If the duty set values d1′ and d2′ are 100, the PWM signals S1 and S2 are always in a low state (a duty ratio of 0%).

With the above-described operation, the phase shifter 21 serves as inversion means for inverting the phase of the second PWM signal S2 that is generated by the second comparator 82, by 180 degrees with respect to the phase of the first PWM signal S1 that is generated by the first comparator 81. Therefore, as shown in FIG. 3, the first PWM signal S1 generated by the first comparator 81 is caused to rise at the leading edge of the predetermined cycle T, while the second PWM signal S2 inverted 180 degrees by the phase shifter 21 is caused to fall at the leading edge of the predetermined cycle T.

Next, a description will be given of the coordinate computation means 22, coordinate determination means 23, servo control means 24, resource-distribution computation means 25, and restriction means 26, which are used for generating the duty set values d1′ and d2′ in the PWM-signal generation circuit 20.

Based on the content of a conveyance request (predetermined operation request) from the host 1 and the peculiar parameters of the library apparatus 2, the coordinate computation means 22 computes a coordinate point to which the hand mechanism 110 (cartridge 200) is moved by the moving mechanisms 120 and 130. The peculiar parameters of the library apparatus 2 are previously held in the library apparatus 2 and are the characteristics of the access mechanism 100 such as inertia, weight, maximum moving distance, maximum moving speed, maximum time for finishing operation, maximum amount of current, etc. The coordinate determination means 23 determines a start coordinate point (X0, Y0) and a target coordinate point (Xp, Yp) which is the end of movement, based on the result of computation obtained by the coordinate computation means 22.

The servo control means 24 generates the duty set values d1 and d2 at predetermined cycles T in order to cause the access mechanism 100 to perform the movement from the start coordinate point (X0, Y0) to the target coordinate point (Xp, Yp), determined by the coordinate determination means 23. More specifically, in order to move the cartridge 200 fastest, the servo control means 24 generates duty set values d1 and d2 so that the comparators 81 and 82 generate the PWM signals S1 and S2 for simultaneously driving two system motors 51 and 52 at peak power.

The resource-distribution computation means 25 computes the amounts of a power resource that are distributed to the motors 51 and 52, based on the above-described peculiar parameters and the coordinate points (X0, Y0) and (Xp, Yp) determined by the coordinate determination means 23.

When the PWM signals S1 and S2 overlap each other (i.e., when the switches 61 and 62 are simultaneously turned on (see a period t3 in FIG. 3) by the first PWM signal S1 from the first comparator 81 and the second PWM signal S2 from the second comparator 82 inverted by the phase shifter 21), the restriction means 26 selects one of the PWM signals S1 and S2 based on the distributed amounts of a power resource computed by the resource-distribution computation means 25, and adjusts the waveform of the selected PWM signal (hereinafter referred to as the selected pulse signal) so that operation (ON-state) of the motor 51 or 52 is restricted by the selected pulse signal. Because of this, the restriction means 26 is made up of priority-order determination means 261, restriction-ratio setting means 262, and a resource distributor 263.

The priority-order determination means 261 determines the priority order (slave/master relationship) of two system motors 51 and 52, based on the distributed amounts of a power resource computed by the resource-distribution computation means 25. Asset forth above, the distributed amounts are computed by the resource-distribution computation means 25, based on the above-described peculiar parameters and the coordinate points (X0, Y0) and (Xp, Yp) determined by the coordinate determination means 23. Also, the coordinate points (X0, Y0) and (Xp, Yp) are computed by the coordinate computation means 22, based on the content of the conveyance request from the host 1 and the above-described peculiar parameters Therefore, the priority-order determination means 261 is able to determine the priority order (slave/master relationship) of two system motors 51 and 52, based on the content of a predetermined operation request (conveyance request from the host 1) relative to the two system motors 51 and 52 and on the above-described peculiar parameters.

The priority-order determination means 261 determines as a slave motor (lower priority) a motor in which the distributed amount is smaller, also determines as a master motor (higher priority) a motor in which the distributed amount is greater, and sets a master flag to the duty set value d1 or d2 on the master side. That is, when the motors 51 and 52 are PWM-driven with the duty set values d1 and d2 generated by servo control means 24, a motor that finishes operation earlier is determined as a slave motor.

Based on the distributed amounts of a power resource computed by the resource-distribution computation means 25, the restriction-ratio setting means 262 sets the restriction ratio of the above-described overlap portion so that operations of the motors 51 and 52 end simultaneously according to the conveyance request from the host 1. The setting of the restriction ratio may be performed at predetermined cycles T, or it may be performed once with respect to one operation request. As with the priority-order determination means 261, the restriction-ratio setting means 262 is also able to set the restriction ratio, based on the content of a predetermined operation request (conveyance request from the host 1) relative to the two system motors 51 and 52 and on the above-described peculiar parameters. The restriction ratio will be described later with reference to FIG. 4.

The resource distributor (adjustment means) 263 selects as the aforementioned selected pulse signal the PWM signal S1 or S2 that drives a slave motor with lower priority determined by the priority-order determination means 261, also adjusts the duty set value d1 or d2 according to the restriction ratio set by the restriction-ratio setting means 262, and outputs the adjusted duty set value d1' or d2' to the comparator 81 or 82. In this way, the resource distributor (adjustment means) 263 restricts operation (ON-state) of the motor 51 or 52 that is performed by the selected pulse signal S1 or S2, thereby adjusting the waveform of the selected pulse signal S1 or S2 so the operations of the motors 51 and 52 end at the same time. The duty set value d2 or d1 for a master motor with higher priority determined by the priority-order determination means 261 is output from the resource distributor 263 to the comparator 82 or 81 as the duty set value d2' or d1' without being adjusted.

Now, the above-described restriction ratio and the operation of the restriction means 26 will be described with reference to FIGS. 4A through 4F.

In the preferred embodiment, the first duty set value d1 is set by the servo control means 24 so that as shown in FIG. 4A, the duty ratio for the first PWM signal S1 is T1/T. Similarly, the second duty set value d2 is set by the servo control means 24 so that as shown in FIG. 4B, the duty ratio for the second PWM signal S2 is T2/T. In the PWM signals S1 and S2 generated according to these duty set values d1 and d2, there is present an overlap portion (the period that the switches 61 and 62 are turned on at the same time) T3, as shown in FIGS. 4A and 4B.

If the restriction ratio set by the restriction-ratio setting means 262 is 0% (i.e., when the operation of a slave motor is not restricted), the duty set values d1 and d2 generated by the servo control means 24 are output as duty set values d1' and d2' to the comparators 81 and 82 without being adjusted, regardless of the priority order determined by the priority-order determination means 261. And the PWM signals S1 and S2 shown in FIGS. 4A and 4B are output to the switches 61 and 62, respectively. Note that the example shown in FIG. 3 corresponds to the case where the restriction ratio is 0%.

When it is determined by the priority-order determination means 261 that the motor 51 (duty set value d1) is a master motor and the motor 52 (duty set value d2) is a slave motor, and a restriction ratio of 50% is set by the restriction-ratio setting means 262, the duty set value d1 generated by the servo control means 24 is output to the first comparator 81 as the duty set value d1' without being adjusted. On the other hand, the duty set value d2' is adjusted by the resource distributor 263 so that as shown in FIG. 4C, the duty ratio of the PWM signal S2 inverted by the phase shifter is (T2−T3/2)/T. The adjusted duty set value d2' is output to the second comparator 82. In this way, the PWM signals S1 and S2 shown in FIGS. 4A and 4C are output to the switches 61 and 62, respectively.

Likewise, when it is determined by the priority-order determination means 261 that the motor 51 (duty set value d1) is a master motor and the motor 52 (duty set value d2) is a slave motor, and a restriction ratio of 100% is set by the restriction-ratio setting means 262, the duty set value d1 generated by the servo control means 24 is output to the first comparator 81 as the duty set value d1' without being adjusted. On the other hand, the duty set value d2' is adjusted by the resource distributor 263 so that as shown in FIG. 4D, the duty ratio of the PWM signal S2 inverted by the phase shifter is (T2−T3)/T. The adjusted duty set value d2' is output to the second comparator 82. In this way, the PWM signals S1 and S2 shown in FIGS. 4A and 4D are output to the switches 61 and 62, respectively.

Conversely, when it is determined by the priority-order determination means 261 that the motor 51 (duty set value d1) is a slave motor and the motor 52 (duty set value d2) is a master motor, and a restriction ratio of 50% is set by the restriction-ratio setting means 262, the duty set value d2 generated by the servo control means 24 is output to the second comparator 82 as the duty set value d2' without being adjusted. On the other hand, the duty set value d1' is adjusted by the resource distributor 263 so that as shown in FIG. 4E, the duty ratio of the PWM signal S1 is (T1−T3/2)/T. The adjusted duty set value d1' is output to the first comparator 81. In this way, the PWM signals S1 and S2 shown in FIGS. 4E and 4B are output to the switches 61 and 62, respectively.

Similarly, when it is determined by the priority-order determination means 261 that the motor 51 (duty set value d1) is a slave motor and the motor 52 (duty set value d2) is a master motor, and a restriction ratio of 100% is set by the restriction-ratio setting means 262, the duty set value d2 generated by the servo control means 24 is output to the second comparator 82 as the duty set value d2' without being adjusted. On the other hand, the duty set value d1' is adjusted by the resource distributor 263 so that as shown in FIG. 4F, the duty ratio of the PWM signal S1 is (T1−T3)/T. The adjusted duty set value d1' is output to the first comparator 81. In this way, the PWM signals S1 and S2 shown in FIGS. 4F and 4B are output to the switches 61 and 62, respectively.

Thus, in the preferred embodiment, when two system motors 51 and 52 are accelerated or decelerated at the same time, one of the two motors has priority over the other, and the power that is supplied to the other motor is restricted according to a restriction ratio set by the restriction-ratio setting means 262. The restriction ratio is suitably set so that operations of the two system motors 51 and 52 end simultaneously according to a predetermined operation request.

In the preferred embodiment, the supply of power to the motors 51 and 52 is performed by PWM. And the phase of one of the PWM signals S1 and S2 of two systems (e.g., the PWM signal S2 in the preferred embodiment) is inverted 180 degrees by the phase shifter 21 so the temporal overlap between the PWM signals S1 and S2 can be minimized. That is, by performing a phase shift such as that mentioned above, the PWM signal S2 always falls at the leading edge of the PWM signal S1, as shown in FIG. 3. Thus, if the sum of the duty ratios of the PWM signals S1 and S2 is less than 100%, there is no temporal overlap between the two signals, and the period of the temporal overlap between the two signals can be minimized.

In the preferred embodiment, when the sum of the duty ratios of the PWM signals S1 and S2 exceeds 100% and, as shown in the third cycle of FIG. 3 and in FIG. 4, temporal overlap occurs between the PWM signals S1 and S2, the degree of overlap is restricted by the restriction means 26. A restriction ratio that is the degree of overlap is determined by the restriction-ratio setting means 262 (which is control firmware) so that operations of the motors 51 and 52 end simultaneously, and is set to a restriction-ratio register (not shown).

As set forth above, in the case of a restriction ratio of 0%, the duty ratio set values d1 and d2 are output as they are, without adjusting the degree of overlap between the PWM signals S1 and S2. On the other hand, in the case of a restriction ratio of 100%, the degree of overlap between the PWM signals S1 and S2 is adjusted by hardware. That is, the duty set value for a slave motor from firmware (servo control means 24) is ignored and the duty set value (waveform of the PWM signal) is adjusted by the resource distributor 263 so there is no overlap between the PWM signals S1 and S2.

Thus, according to the PWM-signal generation circuit (motor controller or control part) as the preferred embodiment of the present invention, with respect to the phase of one (e.g., S1 in the preferred embodiment) of the PWM signals S1 and S2 the phase of the other (e.g., S2 in the preferred embodiment) is inverted 180 degrees, whereby the PWM signal S1 is caused to rise at the leading edge of the predetermined cycle T, and the PWM signal S2 is caused to fall at that leading edge.

In this way, the period that the PWM signals S1 and S2 rise simultaneously can be suppressed to a minimum. Therefore, since the peaks of power consumption are scattered, the peak of current consumed can be suppressed. Also, because the required current-carrying capacity of the entire system (library apparatus 2) is suppressed, load relative to a power supply can be greatly reduced.

Figure 9:
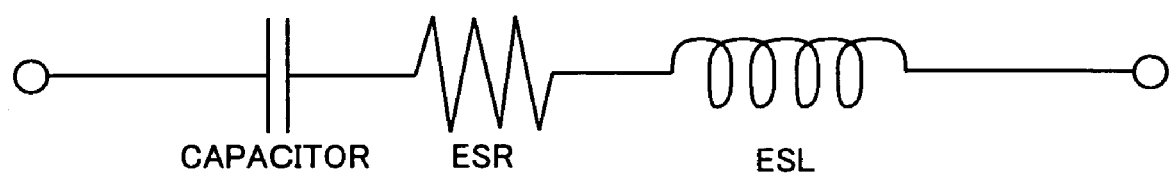
FIG. 9 is a diagram showing a circuit equivalent to a capacitor.

Also, since the peak value of a current pulse is reduced by scattering the peaks of power consumption, the amount of heat that is generated by an ESR component (see FIG. 9) of an aluminum electrolytic capacitor can be suppressed. Therefore, the amount of evaporation of the electrolyte within an aluminum electrolytic capacitor can be suppressed. This can prolong the life of an aluminum electrolytic capacitor that is employed as a bypass capacitor, and can also reduce the failure rate of a printed board greatly.

As set forth above, since the peak of current consumed is suppressed by scattering the peaks of power consumption, electromagnetic compatibility noise that is radiated from transmission lines can be reliably suppressed.

In response to a conveyance request from the host 1, the required amounts of energy of the motors 51 and 52 can be computed from the peculiar parameters of the library apparatus 2 (access mechanism 100) and the components of the coordinate point of the cartridge 200 to be moved. Based on the amounts of energy and within the power capacity of the library apparatus 2, a power resource is distributed between the motors 51 and 52 by the resource-distribution computation means 25.

And when there is temporal overlap between the PWM signal S1 and the PWM signal S2 that is inverted with the phase shifter 21, the waveform of a selected pulse signal (PWM signal on a slave side) is adjusted so that operation (ON state) of a slave motor with lower priority (motor for a system whose load is smaller) determined by the priority-order determination means 261 is restricted according to a restriction ratio set by the restriction-ratio setting means 262. Therefore, since the amount of current that is supplied to a slave motor is restricted so operations of two system motors end simultaneously, an increase in the consumption efficiency of a power supply and a substantial reduction in load can be achieved without sacrificing the conveyance time (performance) required for the access mechanism 100 to convey a cartridge 200.

In the access mechanism 100 of the library apparatus 2, loads on the two system motors 51 and 52 vary, depending on conveyance conditions (e.g., moved distance and a difference in weight). Hence, by varying the degree of temporal overlap between pulse currents to restrict operation (ON-state) of a slave motor (motor for a system whose load is smaller), operations of two system motors 51 and 52 are caused to end at the same time. This can reduce the required capacity of a power supply and current-carrying capacity of a power transmission line and can also reduce device costs (access mechanism 100, etc.).

While the present invention has been described with reference to the preferred embodiment thereof, the invention is not to be limited to the details given herein, but may be modified within the scope of the invention hereinafter claimed.

For example, in the preferred embodiment, the motor controller (PWM-signal generation circuit 20) of the present invention is applied to the library apparatus 2, but the invention is not limited to the library apparatus 2. The present invention is like wise applicable to devices and systems equipped with at least two system motors which are digitally controlled at the same time by PWM, and can have the same advantages as the above-described embodiment.

The functions (the whole or part of the function of each means) of the PWM-signal generators 81 and 82, counter 83, phase shifter 21, coordinate computation means 22, coordinate determination means 23, servo control means 24, resource-distribution computation means 25, and restriction means 26 are realized by carrying out a predetermined application program (motor control program) with a computer such as a central processing unit.

The motor control program is provided in a form recorded on a computer-readable storage medium such as flexible disks, CD-ROM, CD-R, CD-RW, DVD, etc. In this case, computers read out the above-described program from that storage medium, also store it in an internal or external storage unit, and employ it. Also, the motor control program may be stored in a storage medium such as a magnetic disk, optical disk, magneto-optical disk, etc., and computers may read out the control program from that storage medium through communication lines.

In the preferred embodiment, computers include hardware and an operating system (OS) and refer to hardware that operates under control of the OS. In the case where hardware can be operated by an application program alone without the OS, the hardware itself corresponds to a computer. The hardware has at least a microprocessor such as a CPU, and means for reading out programs from a storage medium. The above-described application program contains a program code that causes the aforementioned computers to realize the functions of the PWM-signal generators 81 and 82, counter 83, phase shifter 21, coordinate computation means 22, coordinate determination means 23, servo control means 24, resource-distribution computation means 25, and restriction means 26. Also, some of the functions may be realized by the OS, not by the application program.

The above-described storage medium, in addition to the aforementioned flexible disks, CD-ROM, CD-R, CD-RW, DVD, magnetic disks, optical disks, and magneto-optical disks, may also include IC cards, ROM cartridges, magnetic tape, punch cards, internal storage media for computers (memory such as RAM and ROM), external storage media, and computer-readable media such as a print with a bar code.

What is claimed is:

1. A motor controller for simultaneously controlling operations of at least two system motors by pulse-width modulation, comprising:
    a pair of switches for supplying driving power to a pair of system motors among said at least two system motors, respectively;
    a pair of pulse signal generators for generating a pair of pulse signals respectively having predetermined duty ratios at predetermined cycles, and outputting said pulse signals to said pair of switches to turn on or off said pair of switches; and
    inversion means for inverting a phase of an input signal to one of said pair of pulse signal generators, such that a phase of one of said pair of pulse signals that is generated and output by one of said pair of pulse signal generators is phase shifted by 180 degrees with respect to a phase of a pulse signal generated and output by the other of said pair of pulse signal generators.

2. The motor controller as set forth in claim 1, wherein said one pulse signal is caused to rise at a leading edge of said predetermined cycle, and by inverting the phase of said other pulse signal by 180 degrees by said inversion means, said other pulse signal is caused to fall at said leading edge.

3. The motor controller as set forth in claim 1, further comprising:
    a counter for counting a clock signal, outputting the count to said pair of pulse signal generators, and resetting said count at said predetermined cycles;
    wherein said pair of pulse signal generators compare said count from said counter with duty set values that are set at said predetermined cycles to determine said predetermined duty ratios, and generate and output said two pulse signals according to the result of comparison, respectively;
    and wherein said inversion means is constructed as a phase shifter that inverts a phase of said count that is output from said counter to said other pulse signal generator, with respect to a phase of said count that is output from said counter to said one pulse signal generator.

4. The motor controller as set forth in claim 1, further comprising restriction means that, when there is overlap of said two pulse signals in which said pair of switches are simultaneously turned on by said one pulse signal and said other pulse signal that is inverted by said inversion means, selects one of said two pulse signals and adjusts a waveform of the selected pulse signal to restrict operation of the switch that is turned on by said selected pulse signal.

5. The motor controller as set forth in claim 4, wherein said restriction means comprises:
    priority-order determination means for determining the priority order of said two system motors, based on the content of a predetermined operation request made on said two system motors and characteristics of a device to be driven by said two system motors;
    restriction-ratio setting means for setting, based on the content of said predetermined operation request and the characteristics of said device, a restriction ratio of said overlap so that operations of said two system motors, which are performed according to said predetermined operation request, end simultaneously; and
    adjustment means for selecting as said selected pulse signal a pulse signal that is output to the motor with lower priority determined by said priority-order determination means, and adjusting a waveform of said selected pulse signal according to said restriction ratio set by said restriction-ratio setting means.

6. A conveyance robot for conveying a cartridge with a storage medium in a library apparatus that has a shelf for storing said cartridge and a deck for accessing said storage medium, comprising:
    a hand mechanism for inserting and removing said cartridge while grasping said cartridge;
    a moving mechanism, which includes two system motors, for two-dimensionally moving said cartridge grasped by said hand mechanism; and
    a control unit for simultaneously controlling operations of said two system motors by pulse-width modulation;
    wherein said control unit comprises:
    a pair of switches for supplying driving power to said two system motors, respectively,
    a pair of pulse signal generators for generating a pair of pulse signals respectively having predetermined duty ratios at predetermined cycles, and outputting said pulse signals to said pair of switches to turn on or off said pair of switches, and
    inversion means for inverting a phase of an input signal to one of said pair of pulse signal generators, such that a phase of one of said pair of pulse signals that is generated and output by one of said pair of pulse signal generators is phase shifted by 180 degrees with respect to a phase of a pulse signal generated and output by the other of said pair of pulse signal generators.

7. The conveyance robot as set forth in claim 6, wherein said control unit causes said one pulse signal to rise at a leading edge of said predetermined cycle, and by inverting the phase of said other pulse signal by 180 degrees by said inversion means of said control unit, said other pulse signal is caused to fall at said leading edge.

8. The conveyance robot as set forth in claim 6, wherein:
    said control unit further comprises a counter for counting a clock signal, outputting the count to said pair of pulse signal generators, and resetting said count at said predetermined cycles;
    said pair of pulse signal generators compare said count from said counter with duty set values that are set at said predetermined cycles to determine said predetermined duty ratios, and generate and output said two pulse signals according to the result of comparison, respectively; and
    said inversion means is constructed as a phase shifter that inverts a phase of said count that is output from said counter to said other pulse signal generator, with respect to a phase of said count that is output from said counter to said one pulse signal generator.

9. The conveyance robot as set forth in claim 6, wherein said control unit further comprises:
    restriction means that, when there is overlap of said two pulse signals in which said pair of switches are simultaneously turned on by said one pulse signal and said other pulse signal that is inverted by said inversion means, selects one of said two pulse signals and adjusts a waveform of the selected pulse signal to restrict operation of the switch that is turned on by said selected pulse signal.

10. The conveyance robot as set forth in claim 9, wherein said restriction means comprises:
    priority-order determination means for determining the priority order of said two system motors, based on the content of a predetermined operation request made on said two system motors and characteristics of said moving mechanism to be driven by said two system motors;

restriction-ratio setting means for setting, based on the content of said predetermined operation request and the characteristics of said moving mechanism, a restriction ratio of said overlap so that operations of said two system motors, which are performed according to said predetermined operation request, end simultaneously; and adjustment means for selecting as said selected pulse signal a pulse signal that is output to the motor with lower priority determined by said priority-order determination means, and adjusting a waveform of said selected pulse signal according to said restriction ratio set by said restriction-ratio setting means.

11. A library apparatus comprising:

a shelf for storing a cartridge that houses a storage medium;

a deck for accessing said storage medium; and a conveyance robot for conveying said cartridge been said shelf and said deck, comprising:

a hand mechanism for inserting and removing said cartridge while grasping said cartridge, a moving mechanism, which includes two system motors, for two-dimensionally moving said cartridge grasped by said hand mechanism, and a control unit for simultaneously controlling operations of said two system motors by pulse-width modulation;

wherein said control unit of said conveyance robot comprises:

a pair of switches for supplying driving power to said two system motors, respectively, a pair of pulse signal generators for generating a pair of pulse signals respectively having predetermined duty ratios at predetermined cycles, and outputting said pulse signals to said pair of switches to turn on or off said pair of switches, and inversion means for inverting a phase of an input signal to one of said pair of pulse signal generators, such that a phase of one of said pair of pulse signals that is generated and output by one of said pair of pulse signal generators is phase shifted by 180 degrees with respect to a phase of a pulse signal generated and output by the other of said pair of pulse signal generators.

12. The library apparatus as set forth in claim 11, wherein said control unit causes said one pulse signal to rise at a leading edge of said predetermined cycle, and by inverting the phase of said other pulse signal by 180 degrees by said inversion means of said control unit, said other pulse signal is caused to fall at said leading edge.

13. The library apparatus as set forth in claim 11, wherein:

said control unit further comprises a counter for counting a clock signal, outputting the count to said pair of pulse signal generators, and resetting said count at said predetermined cycles;

said pair of pulse signal generators compare said count from said counter with duty set values that are set at said predetermined cycles to determine said predetermined duty ratios, and generate and output said two pulse signals according to the result of comparison, respectively; and said inversion means is constructed as a phase shifter that inverts a phase of said count that is output from said counter to said other pulse signal generator, with respect to a phase of said count that is output from said counter to said one pulse signal generator.

14. The library apparatus as set forth in claim 11, wherein said control unit further comprises:

restriction means that, when there is overlap of said two pulse signals in which said pair of switches are simultaneously turned on by said one pulse signal and said other pulse signal that is inverted by said inversion means, selects one of said two pulse signals and adjusts a waveform of the selected pulse signal to restrict operation of the switch that is turned on by said selected pulse signal.

15. The library apparatus as set forth in claim 14, wherein said restriction means comprises:

priority-order determination means for determining the priority order of said two system motors, based on the content of a predetermined operation request made on said two system motors and characteristics of said moving mechanism to be driven by said two system motors;

restriction-ratio setting means for setting, based on the content of said predetermined operation request and the characteristics of said moving mechanism, a restriction ratio of said overlap so that operations of said two system motors, which are performed according to said predetermined operation request, end simultaneously; and adjustment means for selecting as said selected pulse signal a pulse signal that is output to the motor with lower priority determined by said priority-order determination means, and adjusting a waveform of said selected pulse signal according to said restriction ratio set by said restriction-ratio setting means.

16. A computer-readable storage medium with a motor control program for causing a computer to realize a motor control function of simultaneously controlling operations of at least two system motors by pulse-width modulation, said motor control program causing said computer to function as:

a pair of pulse signal generators for generating a pair of pulse signals, which turn on or off a pair of switches for supplying driving power to a pair of system motors among said at least two system motors, respectively, having predetermined duty ratios at predetermined cycles, and outputting said pulse signals to said pair of switches; and inversion means for inverting a phase of an input signal to one of said pair of pulse signal generators, such that a phase of one of said pair of pulse signals that is generated and output by one of said pair of pulse signal generators is phase shifted by 180 degrees with respect to a phase of a pulse signal generated and output by the other of said pair of pulse signal generators.

17. The computer-readable storage medium as set forth in claim 16, wherein:

said motor control program causes said computer to function as a counter for counting a clock signal, outputting the count to said pair of pulse signal generators, and resetting said count at said predetermined cycles;

said motor control program causes said pair of pulse signal generators to compare said count from said counter with duty set values that are set at said predetermined cycles to determine said predetermined duty ratios, and generate and output said two pulse signals according to the result of comparison, respectively; and said motor control program causes said inversion means to function as a phase shifter that inverts a phase of said count that is output from said counter to said other pulse signal generator, with respect to a phase of said count that is output from said counter to said one pulse signal generator.

18. The computer-readable storage medium as set forth in claim 16, wherein said motor control program causes said computer to function as restriction means that, when there is overlap of said two pulse signals in which said pair of switches are simultaneously turned on by said one pulse signal and said other pulse signal that is inverted by said inversion means, selects one of said two pulse signals and adjusts a waveform of the selected pulse signal to restrict operation of the switch that is turned on by said selected pulse signal.

19. The computer-readable storage medium as set forth in claim 18, wherein, when said motor control program causes said computer to function as said restriction means, said computer is caused to function as:

priority-order determination means for determining the priority order of said two system motors, based on the content of a predetermined operation request made on said two system motors and characteristics of a device to be driven by said two system motors;

restriction-ratio setting means for setting, based on the content of said predetermined operation request and the characteristics of said device, a restriction ratio of said overlap so that operations of said two system motors, which are performed according to said predetermined operation request, end simultaneously; and adjustment means for selecting as said selected pulse signal a pulse signal that is output to the motor with lower priority determined by said priority-order determination means, and adjusting a waveform of said selected pulse signal according to said restriction ratio set by said restriction-ratio setting means.

* * * * *